United States Patent [19]

Grajoszex

[11] Patent Number: 4,586,216
[45] Date of Patent: May 6, 1986

[54] DEVICE FOR STUNNING ANIMALS INTENDED FOR SLAUGHTER BY ELECTRIC DISCHARGE

[76] Inventor: Jean Grajoszex, Le Moulin Foulon, 61120 Crouttes, France

[21] Appl. No.: 654,081

[22] Filed: Sep. 25, 1984

[30] Foreign Application Priority Data

Sep. 29, 1983 [FR] France ................. 83 15481

[51] Int. Cl.⁴ ............................. A22B 3/06
[52] U.S. Cl. ............................. 17/1 E
[58] Field of Search ........................ 17/1 E

[56] References Cited

U.S. PATENT DOCUMENTS 1,857,658  5/1932  Pfretzschner ............... 17/1 E
3,996,644 12/1976  Andersson ................ 17/1 E X
4,468,837  9/1984  Nijhuis .................... 17/1 E

FOREIGN PATENT DOCUMENTS 0019332 11/1980 European Pat. Off.
0067482 12/1982 European Pat. Off. .......... 17/1 E Primary Examiner—Willie G. Abercrombie
Attorney, Agent, or Firm—Fisher, Christen & Sabol

[57] ABSTRACT

The present invention relates to a device for stunning animals intended for slaughter by electric discharge, of the type comprising means for conveying said animals and at least two retractable electrodes movable between a first active position for which the electrodes are placed on either side of the animal's head and a second retracted position. According to the invention, the electrodes are borne by a carriage mounted to roll freely and movable along guide means conveying the animals and inclined upwardly, from the first active position towards the retracted position under the action of the thrust of the animal, and returned towards its active position by return means operating by gravity. The invention is more particularly applicable to slaughterhouses.

10 Claims, 4 Drawing Figures

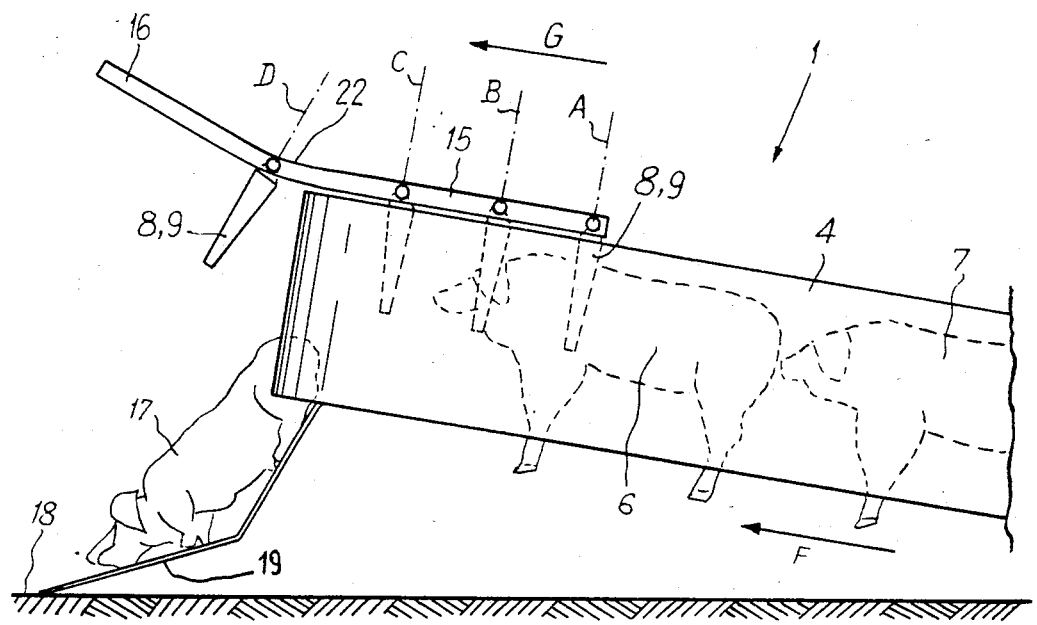
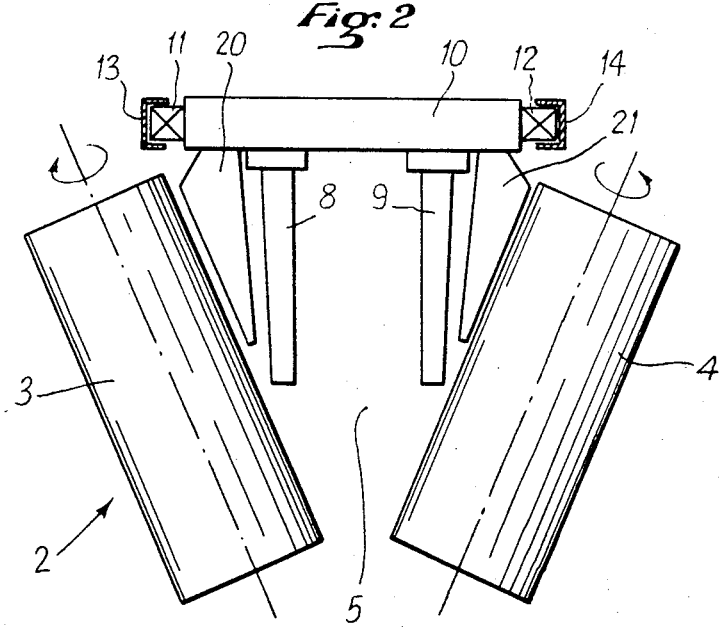

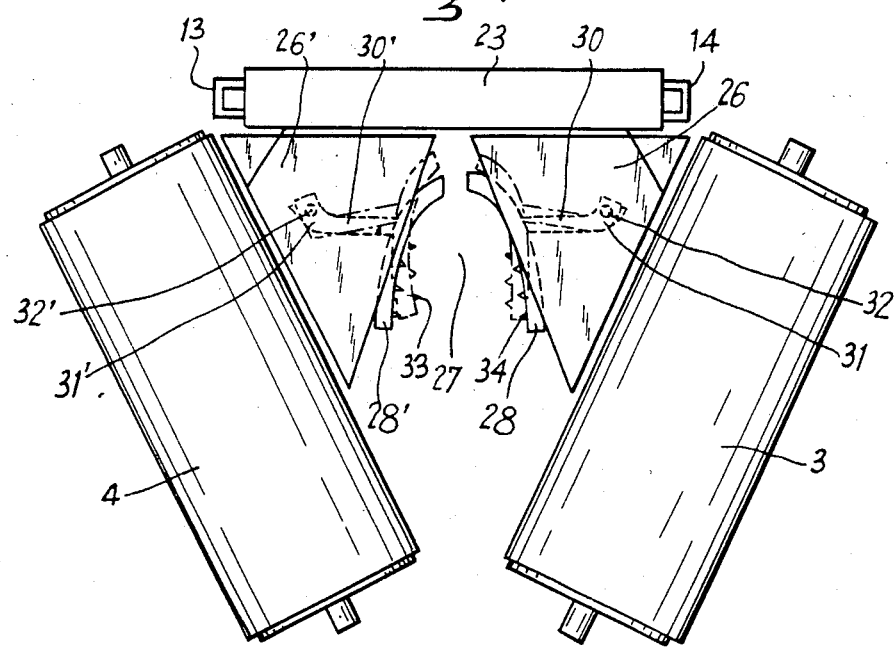
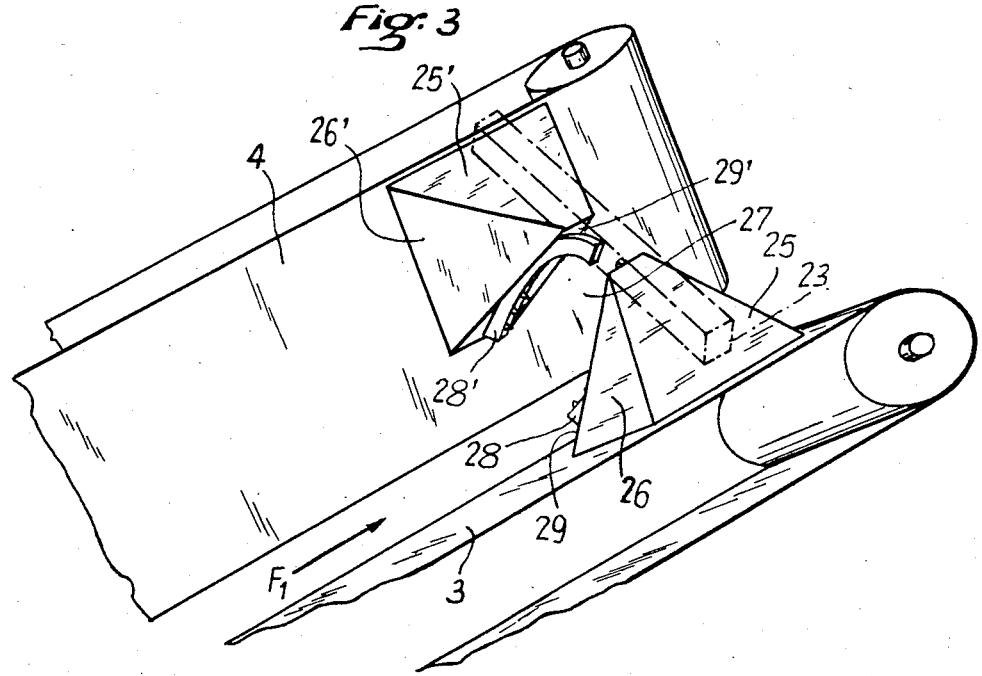

DEVICE FOR STUNNING ANIMALS INTENDED FOR SLAUGHTER BY ELECTRIC DISCHARGE

The present invention relates to a device for stunning animals intended for slaughter by electric discharge.

BACKGROUND OF THE INVENTION

Such devices are already known, of the type comprising, on the one hand, means conveying the animals constituted by two endless belts facing each other and inclined so as to form a V-shaped passageway, and, on the other hand, two retractable electrodes mobile between a first active position for which they are placed on either side of the animal's head and a second retracted position allowing the stunned animal to be released.

In such devices, when it is desired to avoid manual application of the electrodes, which is expensive in manpower and not danger-free, the electrodes are mounted on a system driven by means of driving members between the two extreme positions, as in European Patent Application No. 019 332.

This latter arrangement leads to heavy, expensive and complex constructions. These systems do not ensure strict synchronism (which is necessary) between the advance of the animal (on the conveyor belts) and the electrode-holder carriage.

European Patent Application No. 067 482 provides the suspension of the electrodes from a pendulum-like system, which, however, follows a path which is curved and therefore not parallel to the linear path of the animal's head.

BROAD DESCRIPTION OF THE INVENTION

The present invention relates to a device for stunning animals intended for slaughter by electricity, of simple construction, of reliable and sure operation and which ensures a path both strictly synchronous and strictly parallel between the electrodes and the animal's head during their contact time necessary for ensuring electrocution of the animal.

To this end, the invention relates to a device for stunning animals intended for slaughter by electric discharge, of the type comprising means for conveying said animals, at least two electrodes, a carriage to support said electrodes, and a guide path parallel to the means for conveying the animals to receive the said carriage and to guide it between a first active position for which the electrodes are adapted to be positioned on either side of the animal's head and a second retracted position allowing evacuation of the animal, and this device is characterized in that the electrode-carrying carriage is mounted to roll freely and it is adapted to move along the guide path from its active position towards its retracted position simply by the animal pushing it, and in that the guide path and the means for conveying the animals over the parallel part of their path, follow upwardly inclined parallel directions (from the active position towards the retracted position), the carriage thus being adapted to accompany the advance movement of the animal during electrocution and, after the stunned animal has collapsed, to redescend freely by gravity to its initial position ready for the following animal.

In this way, the electrodes are moved automatically and without consumption of energy since, from the first active position, the electrodes are driven by the animal's head in a path which is strictly parallel and synchronous between the electrodes and the head on which they are applied; after which these electrodes are returned to the initial position by simple gravity.

In order to facilitate the return of the electrodes, the guide path is parallel over a first part of its length to the animal conveyance means and diverges upwardly over the second part of its length.

BRIEF DESCRIPTION OF THE DRAWINGS

The invention will be more readily understood on reading the following description with reference to the accompanying drawings, in which:

FIG. 1 is a side view of an embodiment of the device according to the invention in which the direction of advance of the animals is inclined with respect to the horizontal.

FIG. 2 is a front view of a device in which the direction of advance of the animals is horizontal.

FIG. 3 shows a view in perspective of a variant of the device.

FIG. 4 shows a view in transverse section of the device of FIG. 3.

DETAILED DESCRIPTION OF THE INVENTION

Referring now to the drawings, the device 1 shown in the Figures is of the type comprising conveyance means 2 constituted by two endless belts 3 and 4 facing each other and inclined so as to form a passageway 5 in the form of a V in which the animals 6 and 7 are moved in translation, their flanks bearing on the opposite walls of the endless belts 3 and 4.

The device according to the invention also comprises a pair of mobile, retractable electrodes 8 and 9.

To this end, the electrodes 8 and 9 are fast with a carriage 10 mounted on lateral free bearings 11 and 12 movable along guide means constituted by two rails 13 and 14 parallel to each other, adapted to receive the bearing members.

The guide path defined by the guide rails 13 and 14 comprises a first part 15 parallel to the direction of advance of the animals (arrow F) and a second part 16 diverging upwardly with respect to the first part 15.

According to the embodiment of FIG. 1, the direction of advance of the animals is inclined with respect to the horizontal; consequently the same applies to the first part 15 of the guide path of the carriage 10 bearing electrodes 8 and 9.

The carriage 10 is adapted to move freely along the guide rails 13 and 14 by means of its bearing members 11 and 12.

Operation of the device is described hereinafter.

The animals 6 and 7 are conveyed by the endless belts 3 and 4 in the direction indicated by arrow F in FIG. 1.

The electrodes 8 and 9 are disposed in the passageway 5 in such a manner that they can be placed on either side of the animal's head.

In starting position, the electrodes are in the first extreme position A, i.e. the lowest and rearmost with respect to the possible stroke of the carriage 10.

The first animal, in the present case a pig, arrives and places its head between the electrodes. The animal 6 continuing its advance takes the electrodes along in its movement in the direction of arrow G of FIG. 1, up to an intermediate position B where contactors or position detectors close the electric circuit connecting the electrodes to a source of electric current (not shown).

From that instant, the animal's head receives an electric current which passes through it laterally.

The conveyor belts 3 and 4 continuing their advance take the animal and the electrodes which are still disposed on either side of the animal's head, to another intermediate position C where second contactors or detectors known per se open the electric circuit, thus interrupting the connection of the electrodes with the source of electric energy.

The advance movement of the animals continues up to the end of the belts 3 and 4 where the animal 7, no longer being supported thereby, drops onto the ground or onto an inclined plane or table 19. It should be noted that the animal is stunned from position C.

As the carriage 10 is mounted freely on the rails 13 and 14 which are inclined with respect to the horizontal, it is returned to its first extreme active position A simply by gravity. It therefore rolls along rails 13 and 14 until it reaches the position A where stop members are provided and in which the electrodes are ready for the next animal.

The second retracted position D advantageously lies on the second diverging part 16 of the guide rails 13 and 14. The point of curvature 22 between the first part 15 and the second part 16 therefore lies in the vicinity and just upstream (in the direction of advance of the animals) of the retracted extreme position D.

In this way, the electrodes 8 and 9 move apart forwardly of the passageway 5 as soon as the carriage 10 reaches the second diverging part 16 of the guide rails, as shown by the retracted extreme position D of FIG. 1.

According to FIGS. 3 and 4, the carriage 23 supports the electrodeholder assembly constituted in particular by two boxes 25 and 25' in the form of a tetrahedron. This tetrahedron comprises, downstream, i.e. in the direction of advance of the animal symbolized by arrow F1, a side 26, 26', the two sides 26 and 26' together constituting a cone for guiding towards the central space 27.

Each tetrahedral box 25, 25' thus constitutes an electrically insulated protective casing, inside which may be positioned one of the two electrodes 28 and 28' projecting towards the central space 27 through the open edge 29, 29'.

As shown in FIG. 4, the electrodes 28 and 28' project slightly with respect to the edge 29 and 29' so that the animal's head automatically comes into position between the two electrodes 28 and 28'.

It will be readily understood that the advancing animal, being taken along by conveyors 3 and 4 in the direction of arrow F1, will encounter the guide cone constituted by the two lateral sides 26 and 26'.

These two sides are oriented so as to form a volume diverging downwardly and rearwardly, in other words, converging forwardly and upwardly.

The animal's head is thus necessarily guided towards the central passage 27.

The animal therefore necessarily inserts its head between the two electrodes 28 and 28'.

It will be recalled that, at this stage, the electrode-carrying carriage 23 which is returned into its starting position by simple gravity is immobile and in waiting position; it is free in its movements, being simply guided to free wheel on rails 13 and 14.

The animal encountering the hindrance represented by the insertion of its head in the passage 27 defined by the two electrodes 28 and 28' then attempts to free itself by struggling, particularly by lifting its head.

The electrodes will follow the animal's head in this movement.

In fact, the electrodes 28 and 28' are each mounted on a lever arm 30 and 30', and are in the form of an arc of circle.

The lever arms 30 and 30' bearing the electrodes are mounted to pivot on the end of a bend 31, 31' about a swivel axis 32, 32'.

The electrodes are maintained in low position as shown in solid lines in FIG. 2, by a stop defining their lower rest position.

The electrodes are free in their upward pivoting movement being taken along by the animal's head, in order then to occupy a position as shown in dotted lines in FIG. 4.

In the position as shown in dotted lines, the electrodes ensure intimate, particularly electrical contact with the animal's head, in particular by inner studs 33 and 34.

In this movement, the electrode-holder assembly suspended from carriage 23 automatically and freely accompanies the body of the animal imprisoned by the lateral belts 2 and 3.

When the animal is subjected to the effect of the electric discharge, its body collapses, arriving at that moment at the end of the path guided by the belts 3 and 4 and the body may therefore drop by gravity to be taken up for subsequent treatment.

However, it will be understood that, as soon as the animal has lost its reflexes, being anaesthesized, its head drops and is thus automatically freed from the pressure of the electrodes.

In this way, an entirely automatic system is obtained which enables the time of passage of the current to be metered as a function of the response time of each animal; it is the animal itself which thus comes into optimum position for receiving the current and which triggers off the tetanization action; as soon as this action has produced its effect, which is translated by relaxation of the reflexes and collapse of the body, the assembly, further to the drop of the head, then of the body of the animal, is thus brought into position of disengagement, enabling the electrodes to pivot back towards their initial position with the end of the passage of current.

The system according to the invention is therefore perfectly automatic, ensuring perfect conditions of safety for the personnel who is virtually relieved of any intervention; an optimum effect of tetanization is ensured for each animal, guided automatically towards the position of reception and for which the electrocution time is adapted to its constitution and its response time.

What is claimed is:

1. In a device for stunning animals intended for slaughter by electric discharge, of the type comprising means for conveying said animals, at least two electrodes, a carriage to support said electrodes, and guiding means such as guide rails parallel to the means for conveying the animals to receive the said carriage and to guide it between a first active position for which the electrodes are adapted to be positioned on either side of the animal's head and a second retracted position allowing evacuation of the animal, wherein the electrode-carrying carriage is mounted to roll freely and it is adapted to move along the guide rails from its active position towards its retracted position simply by the animal pushing it, and the guide rails and the means for conveying the animals, follow upwardly inclined parallel directions, from the active position towards the retracted position, the carriage thus being adapted to accompany the advance movement of the animal during electrocution and, after the stunned animal has collapsed, to redescend freely to gravity to its initial position ready for the following animal.

2. The device of claim 1, wherein the guide rails for of the electrodes comprises in the direction of advance of the animals a first linear part parallel to the direction of advance of the animals defined by the conveying means and a second linear part with a greater inclination with respect to the horizontal as compared with said conveyance means.

3. The device of claim 1, wherein the the device has two electrically insulated lateral sides disposed downstream, in the direction of advance of the animal, of said two electrodes, said sides converging towards the electrodes and together defining a cone for guiding the animal's head towards a central free space whose edges are occupied by the two electrodes.

4. The device of claim 3, wherein the two edges of the two sides defining therebetween the central passageway form a downwardly diverging profile.

5. The device of claim 3, wherein the two guiding sides are converging forwardly and upwardly.

6. The device of claim 3, wherein the electrodes are mounted inside a box in the form of a tetrahedron of which a front face in the direction of advance of the animal is constituted by the lateral sides, the tetrahedron resting on its apex and being suspended from the upper carriage along its substantially triangular base, the tetrahedron being open along an edge oriented towards the centre of the passage of the animal, this open edge allowing free movement of the electrodes mounted to move inside the box formed by the tetrahedron.

7. The device of claim 6, wherein the electrodes inserted in their tetrahedral box are mounted to pivot and to this end are fast with a lever arm oriented laterally towards the central passage, the outer end of the lever arm being pivoted about a swivel axis allowing the electrodes to pivot and to return downwards by gravity.

8. The device of claim 3, wherein the electrodes comprise a concave inner edge and have the general form of an arc of circle, and they are supported by a lever arm disposed along a radial axis with respect to the arc of circle constituted by each electrode.

9. The device of claim 7, wherein the end of the lever arm comprises a bend oriented upwardly and supported by the swivel pin of the assembly.

10. The device of claim 7, wherein the upward pivoting movement of each electrode, under the thrust made by the animal in a reflex reaction, is adapted to act on a contactor which triggers off passage of the current and the effect of tetanization of the animal whose head is prisoner between the two electrodes.

* * * * *